United States Patent [19]

Sands

[11] Patent Number: 4,927,188
[45] Date of Patent: May 22, 1990

[54] FITTING FOR CONNECTING A DRUM TO A PIPELINE

[75] Inventor: Philip W. Sands, Coventry, England

[73] Assignee: Shipley Company, Inc., Newton, Mass.

[21] Appl. No.: 278,018

[22] Filed: Nov. 30, 1988

[51] Int. Cl.⁵ ............................................. F16L 41/08
[52] U.S. Cl. ........................................ 285/89; 285/158; 285/220; 285/354; 285/901
[58] Field of Search ................ 285/89, 386, 158, 354, 285/349, 220, 330, 201, 202, 204, 392, 901; 217/99, 110; 215/307; 220/254, 297, 303, DIG. 27, 367; 222/400.7

[56] References Cited

U.S. PATENT DOCUMENTS

| Re. 27,626 | 4/1973 | Johnston | 222/400.7 |
| 70,024 | 10/1867 | Ruegg | 217/99 |
| 1,473,300 | 11/1923 | Kruger | 285/201 X |
| 2,062,199 | 11/1936 | Alvear | 217/98 X |
| 3,462,727 | 8/1969 | Blight | 285/89 X |
| 3,512,676 | 5/1970 | Dawson | 285/201 X |
| 4,699,298 | 10/1987 | Grant | 285/914 X |

FOREIGN PATENT DOCUMENTS

| 0761826 | 6/1967 | Canada | 285/158 |
| 0635555 | 9/1936 | Fed. Rep. of Germany | 285/158 |
| 1102036 | 3/1958 | Fed. Rep. of Germany | 217/110 |
| 0247667 | 2/1926 | United Kingdom | 285/158 |
| 0446020 | 4/1936 | United Kingdom | 217/99 |

Primary Examiner—Randolph A. Reese
Assistant Examiner—Anthony Knight
Attorney, Agent, or Firm—Robert T. Gammons

[57] ABSTRACT

A fitting for connecting a drum containing a fluid product to a pipeline leading to a place of use without introducing contaminant.

13 Claims, 2 Drawing Sheets

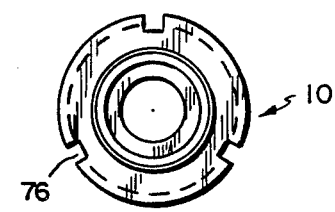
FIG.10
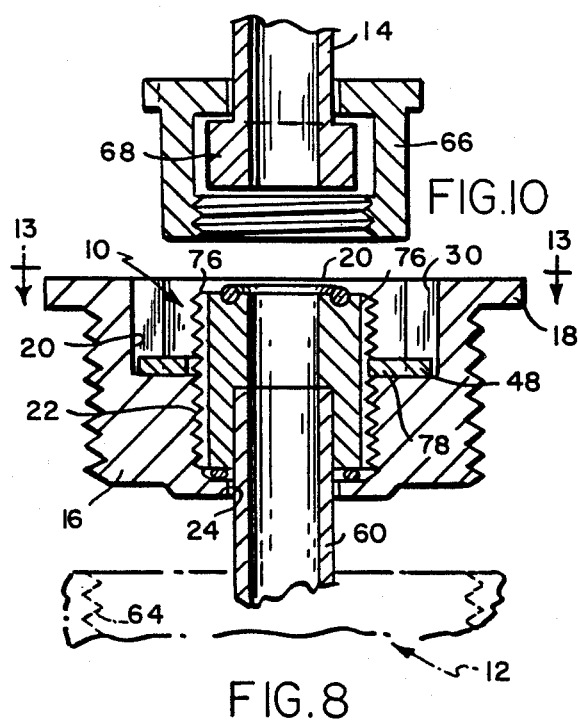
FIG.8
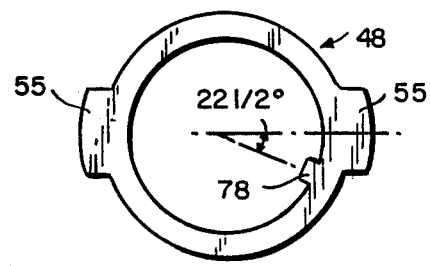
FIG.11
FIG.12
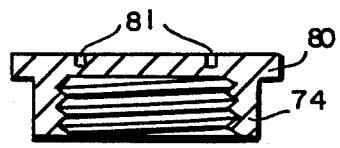
FIG.9
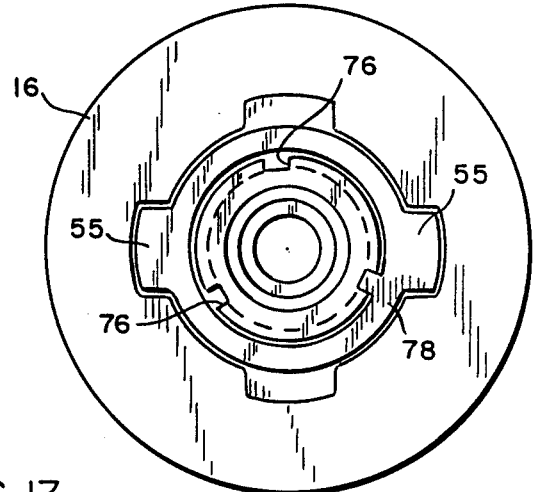
FIG.13

FITTING FOR CONNECTING A DRUM TO A PIPELINE

BACKGROUND OF THE INVENTION

This invention relates to a fitting for transferring liquid product from a container into a clean room without contamination and, in particular, to a non-contaminating fitting of high density polyethylene which is compatible with the product, devoid of moving parts which would generate particles and cheap enough to be disposable in that it adds less than 10% to the cost of packaging.

SUMMARY OF THE INVENTION

As herein illustrated, the invention resides in a fitting for connecting a drum to a pipeline wherein the drum is provided with a bung and wherein the fitting comprises a fitting threaded through the bung with its outer end adjacent to the outer end of the bung and its inner end adjacent the inner end of the bung. A coupling is provided for connecting the outer end of the fitting to the pipeline and a draw tube is provided for connecting the inner end of the fitting to the drum. In the preferred form, the bung contains concentric upper and lower openings, the upper opening being of a larger diameter than the lower opening. The lower opening in the bung is threaded and the fitting is threaded into the threaded lower opening in the bung with its lower end engaged with the threaded lower opening in the bung and with its threaded upper end situated within the upper opening. There is an annular lip at the lower end of the threaded lower opening concentric with the lower opening and an O-ring is disposed between the lip and the lower end of the fitting. A lock washer is disposed in the upper opening about the threaded end of the fitting for locking the fitting in the bung. The coupling is a threaded collar disposed about a flange at the end of the pipeline which is to be connected to the fitting. A closure cap is provided for threaded engagement with the upper threaded end of the fitting when the fitting is disconnected from the pipeline.

BRIEF DESCRIPTION OF THE DRAWINGS

FIG. 4 is a section of a coupling for connecting the fitting to the pipeline;

FIG. 8 is a section of a modified form of fitting for connecting a container to a pipeline;

FIG. 9 is a section of a closure cap for the fitting shown in FIG. 8;

FIG. 10 is a section of a coupling element for connecting the fitting to the pipeline;

FIG. 11 is a plan view of the fitting shown in FIG. 8;

FIG. 12 is a plan view of a lock washer shown in FIG. 8; and

FIG. 13 is a plan view taken on the line 13—13 of FIG. 8.

Figure 1:
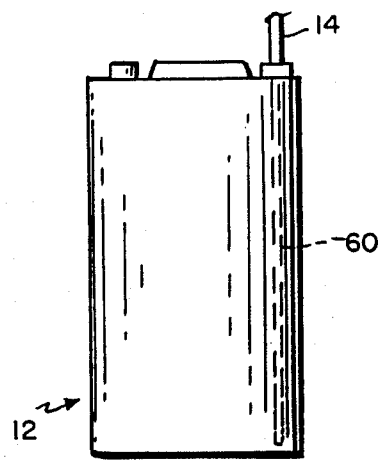
FIG. 1 is an elevation of a container for fluid provided at the top with an fitting element for connecting it to a pipeline.
Figure 2:
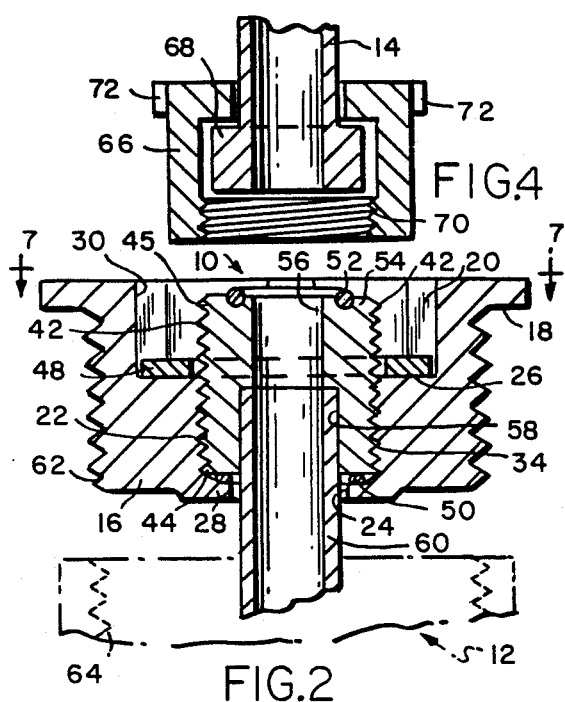
FIG. 2 is a section of a fitting for connecting the container to a pipeline.

Referring to the drawings, FIGS. 1 to 7, the invention resides in a fitting 10, FIG. 2, disposed in a bung 16 for connecting a container 12 to a pipeline 14, FIGS. 1 and 4, for distribution of the contents of the container. Specifically, the fitting 10 is for transferring liquid product from the container 12 by way of a pipeline 14 to a clean room, not shown.

As illustrated in FIG. 2, the bung 16 is provided with a flange 18 and a thread for threaded engagement with the top of the container 12 and has through concentric openings 20, 22 and 24, FIG. 2. The opening 20 extends partway through the bung from the flanged end 18. The opening 22 extends from the inner end of the opening 20 toward the opposite end and the opening 24 extends the remainder of the way through. The opening 20 is of larger diameter than the opening 22 and the opening 22 is of larger diameter than the opening 24 such as to provide a shoulder 26 at the junction of the opening 20 with the opening 22 and a shoulder 28 at the junction of the opening 22 with the opening 24. The opening 20 has radial slots 30, four in number, FIG. 7, extending from top to bottom. The opening 22 is provided with a thread 34 and the opening 24 is cylindrical.

Figure 5:
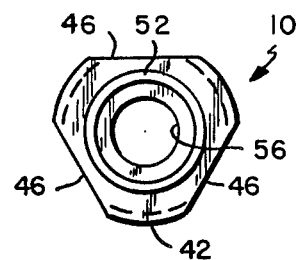
FIG. 5 is a plan view of the fitting.

In accordance with the invention, the fitting 10, FIGS. 2 and 5, is provided with an external thread 42 extending from end to end. The fitting 10 is screwed into the threaded opening 22 and is of such length that when threaded into the opening 22, the upper end 45 extends into the opening 20. A yieldable O-ring 50 is disposed between the lower end of the fitting 10 and the shoulder 28 at the lower end of the opening 22.

Figure 6:
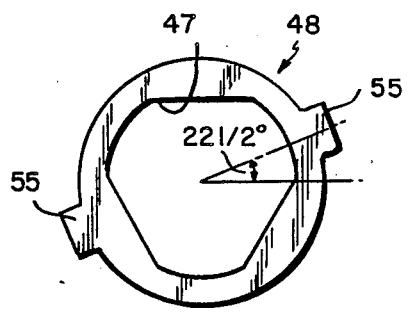
FIG. 6 is a plan view of a lock washer.

The fitting 10, FIG. 5, has equally-spaced flat faces 46 and a lock washer 48, FIG. 6, is provided with flat sides 47 for engagement with the faces 46. The lock washer 48 is provided with radial projections or lugs 55—55 for engagement with the slots 30.

The fitting 10, FIG. 2, contains axial through openings of two diameters comprising an opening 56 partway through and an opening 58 the remainder of the way through. The opening 58 is of larger diameter than the opening 56. The upper end of a draw tube 60 is fixed in the opening 58.

The bung 16, FIG. 2, is provided with an external thread 62 for threaded engagement with a threaded opening 64 at the top or head of the container 12.

For coupling the fitting 10 to the distributor pipe 14, there is provided a collar 66, FIG. 4, disposed about a flange 68 at the proximal end of the distributor pipe 14. The collar 66 has an internal thread 70 for threaded engagement with the threaded end of the fitting 10. Desirably, the collar 66 is provided with diametrically-disposed lugs 72—72 for hand-tightening the collar 66 on the thread 42. An O-ring 52 is recessed into the upper end of the fitting 10 within a groove 54 for sealing engagement with the flange 68.

Figure 3:
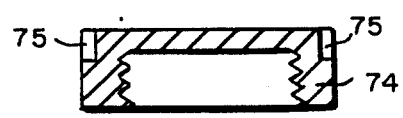
FIG. 3 is a section of a closure cap.
Figure 7:
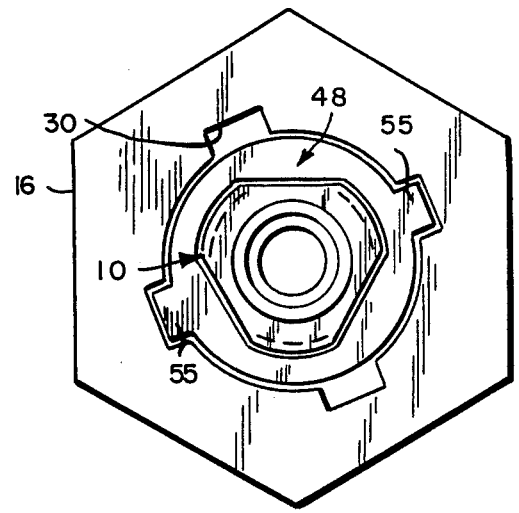
FIG. 7 is a plan view taken on the line 7—7 of FIG. 2.

A threaded closure cap 74 having notches 75—75, FIG. 3, is provided to seal the fitting 10 when not connected to the pipeline.

FIGS. 8 to 13 show structure which differs from that shown in FIG. 1 to 7 in that the fitting 10, FIGS. 8 and 11, is provided with radial slots 76 and the lock washer 48, FIG. 12, is provided with a radial lug 78 for engagement within one of the slots 76. As in the structure shown in FIG. 1 to 7, the lock washer 48 has radial extensions 55 for engagement within the slots 30 in the opening 20.

The closure cap 74, FIG. 9, differs from that shown in FIG. 3 in that it has a peripheral flange 80 and holes 81—81.

As herein illustrated, the diametrically-disposed lugs 55—55 on the outer circumference of the lock washer 48 must be offset 22½ one of the inner flat sides 47 and the lug 78, FIG. 12, is offset 22½ from the actuator lugs 55—55 in order to be reversible and thus to provide six locking points in 90 of rotation.

The structure thus described enables installing the draw tube prior to shipment as part of the packaging of the product.

The preferred fitting is comprised of non-contaminating material as, for example, polyethylene.

It should be understood that the present disclosure is for the purpose of illustration only and includes all the modifications or improvements which fall within the scope of the appended claims.

What is claimed is:

1. A coupling for connecting a drum to a pipeline, comprising a bung threaded into an end of the drum, said bung containing a through opening comprising concentric outer and inner openings, said outer opening being of a larger diameter than the inner opening, said inner opening being threaded, an externally threaded sleeve having inner and outer threaded ends containing a through passage, threaded at one end into the threaded inner opening in the bung with its inner end engaged with the inner threaded end of the inner opening of said bung and a draw tube fixed at one end to the inner end of the sleeve within the through passage of the sleeve and extending therefrom into the drum, said sleeve being contained entirely within said through opening of said bung and means for connecting the pipeline to the sleeve.

2. A coupling according to claim 1 wherein the drum is provided with an opening bounded by an internally threaded flange and the bung is externally threaded for threaded engagement with the internal thread of the flange.

3. A coupling according to claim 1 wherein the threaded sleeve is of cylindrical cross section and has at least one flat side and a lock washer having an opening embodying at least one flat side disposed about the sleeve for engagement with said at least one flat side of the threaded sleeve.

4. A coupling according to claim 3 wherein the threaded fitting is of cylindrical cross section and has three flat sides disposed symmetrically about its periphery and the opening in the lock washer has three flat sides for engagement with said flat sides of said threaded fitting.

5. A coupling according to claim 4 wherein the lock washer has diametrically-disposed lugs, one of which is situated at an angle of 22½ from the peripheral end points of the flat secant.

6. A coupling element according to claim 1 wherein the threaded sleeve has at least one radial slot and a lock washer disposed about the sleeve provided with a internal radial projection for engagement with the slot.

7. A coupling element according to claim 6 wherein the fitting element has three symmetrically-disposed radial slots and the lock washer an internal radial projection situated at an angle of 212½ relative to said slots.

8. A coupling for connecting a drum to a pipeline, comprising a bung threaded into an end of the drum, said bung containing a through opening comprising concentric outer and inner openings, said outer end of the through opening being of larger diameter than the inner end of the through opening and said inner opening being threaded and a threaded sleeve having inner and outer threaded ends containing a through passage, said sleeve being threaded into the threaded through opening in the bung with its inner threaded end engaged with said inner threaded opening, with its outer threaded end contained within the outer opening and a draw tube fixed at one end of the inner end of the sleeve and extending therefrom into the drum.

9. A coupling according to claim 8 comprising an annular lip at the outer end of said threaded opening in the bung concentric with said opening and the draw tube, and an O-ring disposed between the lip and the threaded end of the fitting, providing a seal about the draw tube and the threaded end of the fitting.

10. A coupling according to claim 8 comprising a cap for threaded engagement with the outer threaded end of the fitting.

11. A coupling according to claim 8 wherein the drum embodies a threaded opening and the bung is threaded into said threaded opening.

12. A coupling for connecting a drum to a distribution pipe comprising a bung for threaded engagement with a drum head, said bung containing a threaded opening, said bung further containing an internally-threaded opening for receiving an externally-threaded sleeve and at one end a first annular shoulder defining an opening of smaller diameter than the externally-threaded sleeve concentric with said sleeve, said sleeve containing an axial through opening of two diameters, at the junction of which there is a second annular shoulder, an elongate tube disposed with an end fixed in said opening of smaller diameter against said second annular shoulder and extending therefrom through said opening of smaller diameter and an annular washer disposed about the tube between the end of the sleeve and said annular shoulder such that it is confined between the second annular shoulder and the end of the sleeve.

13. A bung according to claim 12 wherein the sleeve is so threaded that rotation of the sleeve in a clockwise direction clamps the lower end of the sleeve against said annular washer resting on the annular shoulder.

* * * * *